3,364,127
METHOD FOR PRODUCING CAUSTIC SODA AND CHLORINE BY MEANS OF ELECTROLYSIS OF SEA WATER OR OTHER SIMILAR SALTISH WATER
Seiichi Inoue, Nara-shi, Nara-ken, Kuniichi Hayashi, Iwakuni-shi, Yamaguchi-ken, and Takezo Ono, Iwakuni-shi, Yamaguchi-ken, Japan, assignors to Teijin Limited, Osaka, Japan, a corporation of Japan
No Drawing. Filed Aug. 13, 1963, Ser. No. 301,884
Claims priority, application Japan, Aug. 24, 1962, 37/35,025
8 Claims. (Cl. 204—98)

This invention relates to a process for producing concentrated caustic soda and chlorine in high purity by the electrolysis of sea water.

In electrolyzing sea water using mercury electrodes, if magnesium has been removed from the sea water, the current-efficiency of caustic soda at the cathode may exceed 95%, but the current-efficiency of chlorine at the anode may be usually low owing to the generation of a large quantity of oxygen along with the chlorine. If the current-efficiency of chlorine at the anode is low, naturally the current-efficiency of caustic soda at the cathode may be affected, with the consequence that it becomes difficult to produce economically caustic soda and chlorine by the electrolysis of sea water.

Generally, for preventing the oxygen-generation-reaction (i.e., the electrolysis of water) at the anode when electrolyzing an aqueous solution of a metal chloride, what can be conceived is the adoption of either one of the following two measures; namely, (1) the use of an anode having higher oxygen-overvoltage, and (2) the raising of the electrolyte's concentration in the environs of the anode. However, even when an anode of large oxygen-overvoltage such, for example, as platinum, is used in accordance with the first measure, chlorine which still contains about 20% by volume of oxygen can only be obtained. Hence, the current-efficiency of chlorine rises to an extent of only about 60%. It, therefore, becomes necessary to depend on the second measure, and a new idea is required for concentrating the environment of the anode, because the heat evaporation of sea water is uneconomical.

Accordingly, the object of the present invention is to provide a novel means by which the chlorine ion concentration of the anolyte is kept high, with the consequence that concentrated caustic soda along with chlorine in a state of high purity and concentration comparable to that of the case of the conventional electrolysis of a saline solution is obtained electrolytically from sea water.

The above object of this invention is achieved by an electrolytic process comprising partitioning an electrolytic cell into an anode and a cathode compartment with an anion permselective membrane disposed between the anode and cathode, renewably feeding to said cathode compartment (e.g., by causing an overflow from the cathode compartment) a catholyte comprising sea water from which harmful elements in the electrolysis process have been removed, filling said anode compartment with an anolyte comprising a chloride solution of specified concentration for prevention of an oxygen-generation-reaction at the anode, and thereafter carrying out the electrolysis.

This process is effective not only with sea water but also with brackish water, brine and other similar saltish water. The term "saline water" as used herein inclusive of the claims is to be understood as including all of these substances with which the process can be effectively used. Further, the metal chlorides to be used as the constituent of the anolyte include all of those readily water-soluble metal chlorides which can form a sufficiently concentrated aqueous solution may hardly generate any oxygen. But, from the commercial standpoint those to be preferred are the chlorides of the metals having a valency of 1–3, and among these, sodium chloride, ferric chloride and aluminum chloride are particularly suitable.

By controlling the electrolytic system in such a manner that a balance is maintained between the incoming and outgoing substances during the electrolysis the process of the invention can be carried out still more favorably. Control, in this instance, is meant to be the two operations during electrolysis, namely (1) the replenishment of the anode compartment with the same class of metal chloride as contained in the anode solution, and (2) the removal of a part of the water from the anode solution. The reason for the desirability of these two operations theoretically can be explained in the following manner.

First, let us consider the matter of the foregoing "replenishment of the chloride." For convenience of illustration, a system is used comprising an electrolytic cell provided with a mercury cathode and graphite anode, and partitioned into an anode and a cathode compartment by means of an anion perselective membrane, said anode compartment being filled with a concentrated brine as anolyte, and said cathode compartment being filled with a saline water having similar concentration to sea water as catholyte, which latter is renewably fed to the system by allowing it to overflow. When observations are made with respect to the electrolysis carried out by the foregoing system, the ions which discharge at the anode are $Na^+$ and $H^+$ and therefore the cathode reaction of (1)  $2Na^+ + 2F\ominus \rightarrow 2Na$ (amalgam)
(2)  $2H^+ + 2F\ominus \rightarrow H_2$ is obtained.

On the other hand, the ions which discharge at the anode are $Cl^-$ and $OH^-$, and therefore the anode reaction of (3)  $2Cl^- + 2F\oplus \rightarrow Cl_2$
(4)  $2OH^- + 2F\oplus \rightarrow H_2O + O$
(5)  $2OH^- + Cl^- + 2F\oplus \rightarrow ClO^- + 2H_2O$ is obtained.

Here, the ratio of the electricity amount used to carry out the respective reactions of (1), (2), (3), (4) and (5) as given above against the circulated amount of electricity is called discharge rate "$\eta$" ($0 < \eta < 1$), and these are respectively represented by $\eta Na^+$, $\eta H^+$, $\eta Cl^-$, $\eta OH^-$ and $\eta OXY$, and the ratio of current carried by $Na^+$, $H^+$, $Cl^-$ and $OH^-$ infiltrating through the anion permselective membrane is called the ionic transference number of membrane "$t$" ($0 < t < 1$), and these are respectively represented by $^tNa^+$, $^tH^+$, $^tCl^-$ and $^tOH^-$. And in case the amount of electricity is circulated to this system, the relation between the amount of ion discharged at the cathode and anode, and the amount of ion passing through the anion permselective membrane is represented by the following formula:

(6)  $^\eta Na^+ + ^\eta H^+$ (cathode) $= ^\eta OH^- + ^\eta Cl^- + ^\eta OXY$ (anode)
        $= ^tNa^+ + ^tH^+ + ^tOH^- + ^tCl^-$ (anion permselective membrane)

In the case the loss of ions from the above-mentioned electrolysis is ignored, under the normal conditions of electrolysis, the amount of $H^+$ to be consumed at the anode, the amount of $OH^-$ to be consumed at anode, and the amount of ($H^+ + OH^-$) passing through the anion permselective membrane must be respectively equivalent (because, when this equivalent relation is maintained, $OH^-$ is accumulated in the cathodic compartment, and $H^+$ is accumulated in the anodic compartment, and thus normal conditions are not maintained) and therefore, the following formula is obtained:

(7) $\quad \eta H^+ = \eta OH^- + \eta OXY = {}^tH^+ + {}^tOH^-$

Thus, if expression 7 is subtracted from expression 6, the following results.

(8) $\quad \eta Na^+ = \eta Cl^- = {}^tNa^+ + {}^tCl^-$

It is seen from Formula 8 that the current-efficiency of caustic soda and that of chloride are theoretically equal, and these current-efficiencies are equal to the sum of the transference number regarding $Na^+$ of anion permselective membrane and the transference number regarding $Cl^-$ of anion permselective membrane. Of course, Formula 8 has been introduced under the presumption that there is no escape of $H^+$ and $OH^-$ from the electrolysis, however, as a matter of fact, there is some of $H^+$ and $OH^-$ and at the renewal of brine (6) and the anolyte (8), the said formula is only approximate.

Now, in regard to the anolyte, ${}^tCl^-$ is the factor relating to the incoming of $Cl^-$, and $\eta Cl^-$ is the factor relating to the outgoing of $Cl^-$.

When the anion permselective membrane is ideally prepared, the cation is completely blocked and ${}^tNa^+ = 0$ is obtained, but as a matter of fact, minute amounts of the cation is passed through the said membrane and therefore ${}^tNa^+$ is larger than zero and therefore ${}^tCl^-$ is smaller than $\eta Cl^-$ (${}^tCl^- < \eta Cl^-$) from the Formula 8.

There is a fear of NaCl in the anolyte being completely exhausted when the electric current is circulated where $Cl^-$ is being exhausted. Therefore, when the electrolysis is to be continuously conducted, the consumed amount of $Cl^-$ must be made up in the anolyte by supplying $Cl^-$ as it is consumed. The consumed amount of $Cl^-$ is ($\eta Cl^- - {}^tCl^-$) gram equivalent per 1 faraday of circulated current, or ($\eta Cl^- - {}^tCl^-$)/$\eta Cl^-$ gram equivalent per 1 gram equivalent of generated chlorine.

Moreover, ($Cl^- - {}^tCl^-$) changes in accordance with the kind of the salts contained in the anolyte, and the properties of anion permselective membrane. When the anion permselective membrane is the same, the greater the ionic valency is, the smaller the value of ($Cl^- - {}^tCl^-$) becomes. The catholyte can be cast away after it has served its role, however, from the economical point of view, the anolyte cannot be cast away, and the recovery thereof must be considered.

Next, the matter of "the removal of water" which was indicated hereinbefore as being the second control operation will be explained. The gains of water in the anode compartment amount to four in number namely:

(a) Water brought along by $Cl^-$ migrating through the anion permselective membrane;

(b) Water entering as a result of the difference in osmotic pressure between the two sides of the anion permselective membrane;

(c) Water brought along by $OH^-$ migrating through the anion permselective membrane and the water formed in the anode compartment by neutralization; and (d) Water resulting from the metal chloride replenished to the anode compartment.

On the other hand, the losses also amount to four in number; namely:

(e) Water consumed by the electrolytic reaction;

(f) Water taken away by $H^+$ through the anion permselective membrane;

(g) Water taken away by $Na^+$ and the other cations through the anion permselective membrane; and (h) Water taken away by the gases (chlorine and oxygen) generated. When the gain and loss of water is compared, empirically, the gain at all times being greater, the result is that as the electrolysis proceeds an accumulation of water gradually takes place in the anode compartment. While the amount of water accumulation is dependent on such as the permeability of the anion permselective membrane, the membrane current density and the electrolyzing temperature, according to our experience, it was in most cases of the order of 3–10 moles per equivalent of chlorine generated. Hence, by removing from the anode compartment during the electrolysis water in about these amounts a balance in the gains and losses of the materials can be achieved so as to make it possible for the electrolysis to proceed smoothly.

Various ways are available for accomplishing the hereinabove described operations of replenishing the chloride and removing the water. For example, these operations are suitably carried out by a method which comprises adding the chloride in its still solid (crystalline or powder) state to the anode solution while, at the same time, a partial removable of the anode solution is effected to the outside of the system where a part of the water is removed from the solution by evaporation after which the residual solution is returned to the anode compartment; or by a method which comprises effecting the partial removal of the anode solution to the outside of the system where a part of the water is removed from the solution by evaporation by heating, then adding the chloride in its still solid state to the solution and thereafter returning the solution to the anode compartment. Needless to say, the chloride, instead of being added in its solid state, may also, if necessary, be added in the form of a concentrated aqueous solution.

The process of this invention can be applied equally well to either the so-called mercury process or diaphragm process. As in the known electrolytic cells, graphite and other chlorine resistant electrodes are used for the anode, whereas mercury, in the case of the mercury process, and iron, in the case of the diaphragm process, are used for the cathode. Further, except for the specific conditions mentioned herein, the operative conditions in carrying out the electrolysis can be suitably selected from any of the known processes.

In order to protect the anion permselective membrane from liberated chlorine, it is also possible in this invention to dispose a diaphragm between the anion permselective membrane and the anode, thus forming a central compartment between both electrodes. In this case the anolyte is made to flow from the central compartment to the anode compartment through the foregoing diaphragm.

From the sea water to be used as a catholyte it is desirable to remove in advance the harmful ions such as $Mg^{2+}$. However $Ca^{2+}$ is hardly harmful. Further, since the $SO_4^{--}$ which enters the anode compartment along with $Cl^-$ has a property of corroding the graphite electrode when it discharges at the anode, it is preferred that care be exercised to ensure that the concentration of $SO_4^{--}$ does not become excessive.

In summary, the essential operational factors of the present invention are to conduct electrolysis by filling the concentrated chloride solution in the anodic compartment, and the brine in the cathodic compartment with the anion permselective membrane inserted between the anodic and cathode whereby the electrolytic cell is divided into a cathodic compartment and an anodic compartment, to carry out the renewal of both anolyte and catholyte during the electrolysis, to appropriately dehydrate both anolyte and catholyte, and to supply appropriate amount of chloride to the anolyte.

Other factors such as to employ mercury as the cathode, to employ a vertical type mercury cathode, and to insert the diaphragm between the anion permselective membrane and electrodes, are all preferable, but not essential, and therefore it is also possible, of course, to produce caustic soda in the cathodic compartment by using anion cathode.

For a clearer understanding, the following examples are given. These examples are merely illustrative of preferred modes of practicing the invention and are not in limitation thereof.

Example 1

A vertical two-compartment electrolytic cell partitioned with a strongly basic anion exchange membrane was employed, and the electrolysis was carried out by overflowing into its cathode compartment sea water (total chlorine concentration, calculated as common salt, 30 g./l.) from which magnesium had been previously removed, filling its anode compartment with a dense brine of a concentration of 300 g./l., and with a membrane current-density of 6 a./dm.$^2$.

While adding to the anode compartment 0.074 gram equivalent of crystalline common salt per gram equivalent of chlorine generated, a suitable quantity of the anode solution was taken out. This solution was heated to evaporate 6.4 moles of water per gram equivalent of chlorine generated, after which the residual solution was returned to the anode compartment thereby controlling the maintenance of a balance in the gains and losses between the common salt and water of the anode solution.

The concentration of the formed caustic soda was 0.5 g./l., the current-efficiency was 97.8%, the concentration of the chlorine generated was 99 vol. percent and the current-efficiency was 97.8% (platinum anode). On the other hand, the amount of sea water used per gram equivalent of chlorine generated was 80 kg.

Example 2

A vertical two-compartment electrolytic cell partitioned with a strongly basic anion exchange membrane was employed, and the electrolysis was carried out by overflowing into its cathode compartment sea water (total chlorine concentration, calculated as common salt, 30 g./l.) from which magnesium had been previously removed, filling its anode compartment with an aluminum chloride solution of a concentration of 220 g./l., and with a membrane current-density of 6 a./dm.$^2$.

A suitable quantity of the anode solution was taken out from one corner of the anode compartment while not replenishing aluminum chloride thereto. This solution was heated to evaporate 6.3 moles of water per gram equivalent of chlorine generated, after which the residual solution was returned to the anode compartment thereby controlling the maintenance of a balance in the gains and losses between the aluminum chloride and water of the anode solution.

The concentration of the formed caustic soda was 0.5 g./l., the current-efficiency was 97.0%, the concentration of the chlorine generated was 98 vol. percent and the current-efficiency was 97.0% (platinum anode). On the other hand, the quantity of sea water used was 79 kg. per gram equivalent of the chlorine generated.

Example 3

A vertical two-compartment electrolytic cell partitioned with a strongly basic anion exchange membrane was employed, and the electrolysis was carried out by overflowing into its cathode compartment sea water (total chlorine concentration, calculated as common salt, 30 g./l.) from which magnesium chloride had been previously removed, filling its anode compartment with a ferric chloride solution of a concentration of 200 g./l., and with a membrane current-density of 4 a./dm.$^2$.

While adding to the anode compartment 0.013 gram equivalent of ferric chloride (anhydrous crystals) per gram equivalent of chlorine generated, a suitable quantity of the anode solution was taken out from one corner thereof. This solution was then heated drive off 8.0 moles of water per gram equivalent of chlorine formed, after which the residual solvent was returned to the anode compartment thereby controlling the maintenance of a balance in the gains and losses between the ferric chloride and water of the anode solution.

The concentration of the caustic soda formed was 0.5 g./l., the current-efficiency was 93%, the concentration of the chlorine generated was 96 vol. percent and the current efficiency was 93% (platinum anode). On the other hand, the sea water used per gram equivalent of chlorine generated was 81 kg.

Example 4

In an above-mentioned vertical type two-compartment electrolytic cell partitioned with a strongly basic anion exchange membrane, a central compartment was formed by interposing between said anion membrane and a cathode of a perforated iron plate a diaphragm prepared of polyvinyl chloride cloth. Sea water (total chlorine concentration, calculated as common salt, 30 g./l.) was caused to flow from this central compartment to the cathode compartment through this diaphragm, whereby the concentration of OH$^-$ in the central compartment was reduced to 0.01 gram equivalent per liter or less. A dense brine of a concentration of 310 g./l. was poured into the anode compartment.

Electrolysis was then carried out with a membrane current-density of 6 a./dm.$^2$, and in the meanwhile the dense brine flowing out of the anode compartment was heated to remove by evaporation 6.4 moles of water per gram equivalent of chlorine generated, after which 0.072 gram equivalent of crystalline common salt per gram equivalent of chlorine generated was added to the residual solution which was then returned to the anode compartment thereby controlling the maintenance of a balance in the gains and losses between the common salt and water of the anode solution.

The concentration of the caustic soda formed was 5 g./l., the current-efficiency was 96.7%, the concentration of the chlorine formed was 99 vol. percent and the current-efficiency was 96.7% (graphite anode). On the other hand, the quantity of sea water consumed per each gram equivalent of chlorine generated was 8 kg.

Example 5

In an above-mentioned vertical type two-compartment electrolytic cell partitioned with a strongly basic anion exchange membrane, a central compartment was formed by interposing between the anion membrane and a cathode of a perforated iron plate a diaphragm prepared of polyvinyl chloride cloth. Sea water (total chlorine concentration, calculated as common salt, 30 g./l.) was caused to flow from this central compartment to the cathode compartment through this diaphragm, whereby the concentration of OH$^-$ in the cathodic central compartment was reduced to 0.01 gram equivalent per liter or less. An aluminum chloride solution having a concentration of 230 g./l. was poured into the anode compartment.

Electrolysis was then carried out with a membrane current-density of 6 a./dm.$^2$, and in the meanwhile the aluminum chloride solution flowing out of the anode compartment was heated to remove by evaporation 6.3 moles of water per gram equivalent of chlorine generated, after which the residual solution was returned to the anode compartment without replenishing the aluminum chloride, whereby a balance in the gains and losses between the aluminum chloride and water was maintained.

The concentration of the caustic soda formed was 5 g./l., the current-efficiency was 96.7%, the concentration of the chlorine generated was 98 vol. percent and the current-efficiency was 96.7% (graphite anode). On the other hand, the quantity of sea water consumed per gram equivalent of chlorine generated was 8 kg.

Example 6

A vertical type two-compartment electrolytic cell partitioned with a strongly basic anion exchange membrane and having a falling-film-type mercury cathode was employed, and the electrolysis was carried out by overflowing to the cathode compartment sea water (total chlorine concentration, calculated as common salt, 30 g./l.) from which magnesium had been previously removed, pouring into the anode compartment a dense brine of a concentration of 310 g./l., and with a membrane current-density of 10 a./dm.².

In the meantime, the dense brine flowing out of the anode compartment was heated to drive off 6.2 moles of water per gram equivalent of chlorine generated, after which 0.083 gram equivalent of crystalline common salt per gram equivalent of chlorine generated was added to the residual solution, which solution was then returned to the anode compartment, whereby was maintained a balance in the gains and losses between the common salt and water of the anode solution.

The concentration of sodium in the sodium amalgam obtained by this electrolyis was 0.2 wt. percent, which when decomposed yielded caustic soda having a concentration of 50 wt. percent. The current-efficiency was 96%, the concentration of the chlorine generated was 98 vol. percent and the current-efficiency was 96% (graphite anode). On the other hand, 7.5 kg. of sea water was used per gram equivalent of chlorine produced.

*Example 7*

A vertical type electrolytic cell partitioned with a strongly basic anion exchange membrane and having a falling-film-type mercury cathode was employed, and the electrolysis was carried out by overflowing to the cathode compartment sea water (total chlorine concentration, calculated as common salt, 30 g./l.) from which magnesium had been previously removed, pouring into the anode compartment an aluminum chloride solution of a concentration of 220 g./l., and with a membrane current-density of 10 a./dm.².

In the meanwhile, the aluminum chloride solution flowing from the anode compartment was heated thereby removing by evaporation 6.5 moles of water per gram equivalent of chlorine generated, after which the residual solution was returned to the anode compartment without replenishing the aluminum chloride, whereby was maintained a balance in the gains and losses between the aluminum chloride and the water.

The concentration of sodium in the sodium amalgam obtained by this electrolysis was 0.2 wt. percent, which, when decomposed, yielded caustic soda having a concentration of 50 wt. percent, the current-efficiency being 96.3%. The concentration of the chlorine generated was 98 vol. percent and the current-efficiency was 96.3% (graphite anode). On the other hand, the quantity of sea water used per gram equivalent of chlorine generated was 7.6 kg.

*Example 8*

A vertical type two-compartment electrolytic cell partitioned by a strongly basic anion exchange membrane and having a falling-film-type mercury cathode was employed, and the electrolysis was carried out with a membrane current-density of 10 a./dm.² and by overflowing to the cathode compartment sea water (total chlorine concentration, calculated as common salt, 30 g./l.) from which magnesium had been previously removed, setting up a central compartment by interposing a diaphragm prepared of polyvinyl chloride cloth between the anion membrane of the anode compartment and the graphite anode, and causing a dense brine of a concentration of 310 g./l. to flow (the rate of flow exceeding 1.5 cc./hr. per cm.² the diaphragm) from this anodic central compartment to the anode compartment through this diaphragm, thereby preventing during the electrolysis the entry to the central compartment of the anode solution in which chlorine is dissolved.

In the meanwhile, the dense brine flowing out from the anode compartment was heated to remove by evaporation 6.6 moles of water per gram equivalent of chlorine generated, after which 0.084 gram equivalent of crystalline common salt per gram equivalent of chlorine generated was added to the residual solution, which solution was then returned to the anode compartment, thereby maintaining a balance in the gains and losses between the table salt and water of the anode solution.

The concentration of sodium in the sodium amalgam obtained by this electrolysis was 0.2 wt. percent. The caustic soda obtained by decomposition of this sodium amalgam had a concentration of 50 wt. percent and a current-efficiency of 96.2%. The concentration of the chlorine generated was 98 vol. percent and the current-efficiency was 96.2%. On the other hand, the consumption of sea water per gram equivalent of chlorine generated was 7.3 kg.

*Example 9*

A vertical type two-compartment electrolytic cell partitioned with a strongly basic anion exchange membrane and having a falling-film-type mercury cathode was employed, and the electrolysis was carried out by overflowing to the cathode compartment brine (total chlorine concentration, calculated as common salt, 50 g./l.) from which magnesium had been previously removed, pouring into the anode compartment a dense brine of a concentration of 310 g./l., and with a membrane current-density of 10 a./dm.².

In the meanwhile, the dense brine flowing from the anode compartment was heated to remove by evaporation 4.5 moles of water per gram equivalent of chlorine generated, after which was added to the residual solution 0.075 gram equivalent of crystalline common salt per gram equivalent of chlorine generated, which was then returned to the anode compartment, thereby maintaining a balance in the grains and losses between the common salt and water of the anode solution.

The concentration of sodium in the sodium amalgam obtained by this electrolysis was 0.2 wt. percent, and the concentration of the caustic soda obtained by decomposing this sodium amalgam was 50 wt. percent, the current-efficiency being 97%. The construction of the chlorine generated was 98.5 mol percent and the current-efficiency was 97% (graphite anode). On the other hand, the quantity of sea water used was 4.5 kg. per gram equivalent of chlorine generated.

*Example 10*

A vertical type two-compartment electrolytic cell partitioned by a strongly basic anion exchange membrane and having a falling-film-type mercury cathode was employed, and the electrolysis was carried out with a membrane current-density of 10 a./dm.² and by overflowing to the cathode compartment brine (total chlorine concentration, calculated as common salt, 100 g./l.) from which magnesium had been previously removed, setting up a central compartment by interposing a diaphragm prepared of polyvinyl chloride cloth between the anion membrane of the anode compartment and the graphite anode, and causing an aluminum chloride solution of a concentration of 220 g./l. to flow (the rate of flow exceeding 1.5 cc./hr. per cm.² of the diaphragm) from this central compartment to the anode compartment through this diaphragm, thereby preventing during the electrolysis the entry to the central compartment of the anode solution in which chlorine is dissolved.

In the meanwhile, the aluminum chloride solution flowing out from the anode was heated to remove by evaporation 3.7 moles of water per gram equivalent of chlorine generated, after which the residual solution without being replenished with aluminum chloride was returned to the anode compartment, thereby maintaining a balance in the gains and losses between the aluminum chloride and water of the anode solution.

The concentration of the sodium in the sodium amalgam obtained by this electrolysis was 0.2 wt. percent. When the sodium amalgam was decomposed, the concentration of the caustic soda obtained was 50 wt. percent and the current-efficiency was 97.5%. The concentration of the chlorine generated was 98.5 vol. percent and the current-efficiency was 97.5%. On the other hand, the consumption of brine per gram equivalent of chlorine generated was 3.0 kg.

What is claimed:

1. A process for the production of caustic soda and chlorine by the electrolysis of saline water in an electrolytic cell, said electrolytic cell partitioned into a cathodic compartment and an anodic compartment, said compartments partitioned with an anion-permselective membrane, which comprises filling the anodic compartment with a concentrated aqueous solution of metallic chlorides, filling the cathodic compartment with saline water and then renewing said saline water, said saline water being removed of harmful components which interfere with electrolysis, conducting electrolysis of the concentrated aqueous solution of metallic chloride and said saline water, removing the anolyte from the electrolytic cell during the electrolysis, and returning the anolyte to the anode compartment of the electrolytic cell after removing therefrom 3–10 mols of water per one faraday of circulated electrolysis current.

2. The process according to claim 1 which comprises setting up a central compartment by disposing a diaphragm between said anion permselective membrane and an electrode and causing the electrolyte to flow from said central compartment to an electrode compartment through said diaphragm.

3. The process according to claim 2 wherein said metallic chloride has a cationic valency between 1 and 3.

4. The process according to claim 2 wherein said metallic chloride is selected from the group consisting of sodium chloride, ferric chloride and aluminum chloride.

5. The process according to claim 1 wherein said metallic chloride has a cationic valency between 1 and 3.

6. The process according to claim 1 wherein said metallic chloride is selected from the group consisting of sodium chloride, ferric chloride and aluminum chloride.

7. A process for the production of caustic soda and chlorine by the electrolysis of saline water in an electrolytic cell, said electrolytic cell partitioned into a cathodic compartment and an anodic compartment, said compartments partitioned with an anion-permselective membrane, which comprises filling the anodic compartment with a concentrated aqueous solution of metallic chloride, filling the cathodic compartment with saline water and then renewing said saline water, said saline water being removed of harmful components which interfere with electrolysis, conducting electrolysis of the concentrated aqueous solution of metallic chloride and said saline water, removing the anolyte from the electrolytic cell during the electrolysis, and returning the anolyte to the anode compartment of the electrolytic cell after removing therefrom 3–10 mols of water per one faraday of circulated electrolysis current and after supplying to said anolyte metallic chloride at $(\mu_{Cl^-} - t_{Cl^-})$ gram equivalent per one faraday of circulated electrolysis current (wherein $\mu_{Cl^-}$ is the discharge rate of chloride, and $t_{Cl^-}$ stands for the transference number regarding $Cl^-$ of an anion permselective membrane.

8. The process according to claim 7 which comprises setting up a central compartment by disposing a diaphragm between said anion permselective membrane and an electrode and causing the electrolyte to flow from said central compartment to an electrode compartment through said diaphragm.

References Cited

UNITED STATES PATENTS

| | | | |
|---|---|---|---|
| 2,636,852 | 4/1953 | Juda et al. | 204—180 |
| 2,800,445 | 7/1957 | Clarke | 204—180 |
| 2,967,806 | 11/1961 | Osborne et al. | 204—263 |
| 2,982,608 | 5/1961 | Clement | 204—98 X |
| 3,055,734 | 9/1962 | Pomykala | 204—128 |
| 3,163,599 | 12/1964 | Salutsky et al. | 204—128 |
| 3,214,362 | 10/1965 | Juda | 204—98 |
| 3,244,609 | 4/1966 | Szechtman | 204—219 |
| 2,860,097 | 11/1958 | Juda et al. | 204—296 |
| 3,052,612 | 9/1962 | Henegar et al. | 204—98 |
| 3,084,113 | 4/1963 | Vallino | 204—263 |

FOREIGN PATENTS

| | | |
|---|---|---|
| 492,347 | 9/1938 | Great Britain. |
| 738,520 | 10/1955 | Great Britain. |

OTHER REFERENCES

Mantell, "Electrochemical Engineering," 4th edition (1960), pp. 248–292.

HOWARD S. WILLIAMS, *Primary Examiner.*

MURRAY TILLMAN, JOHN H. MACK, *Examiners.*

L. G. WISE, H. M. FLOURNOY, *Assistant Examiners.*